Sept. 3, 1968        R. GOTTSCHALD        3,399,913
BALL JOINTS, ESPECIALLY FOR GUIDES AND STEERING
GEAR, PREFERABLY IN MOTOR VEHICLES
Filed Dec. 13, 1966
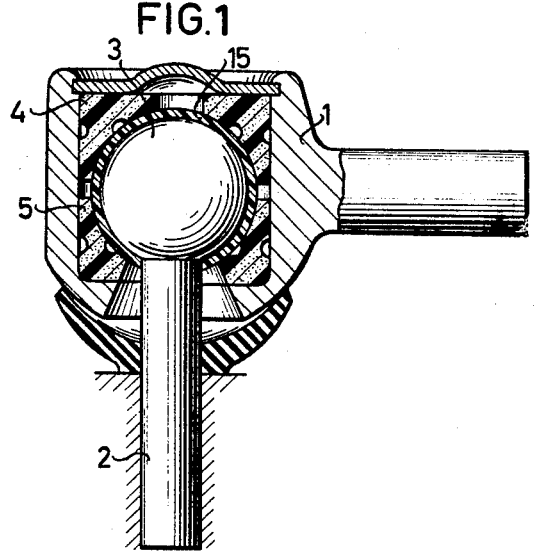
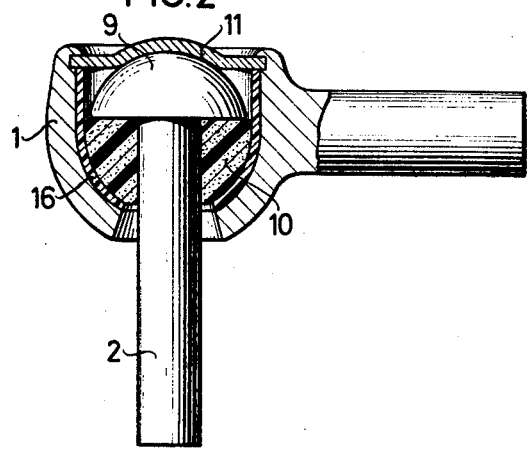
INVENTOR
RUDOLF GOTTSCHALD
BY
Arthur Schwartz
ATTORNEY United States Patent Office 3,399,913
Patented Sept. 3, 1968

3,399,913
BALL JOINTS, ESPECIALLY FOR GUIDES AND STEERING GEAR, PREFERABLY IN MOTOR VEHICLES
Rudolf Gottschald, Osterath, Germany, assignor to A. Ehrenreich & Cie, Dusseldorf-Oberkassel, Germany
Filed Dec. 13, 1966, Ser. No. 601,365
Claims priority, application Germany, Dec. 15, 1965, E 30,662
2 Claims. (Cl. 287—87)

ABSTRACT OF THE DISCLOSURE

The present invention relates to a ball joint which is specially intended for guides and steering gear, wheel suspension and similar, preferably in motor vehicles, and which comprises a joint case and a joint pin together with a ball head being supported in the joint case so that it will be universally movable, one of the bearing surfaces being movable relatively towards each other being made from synthetic plastic material and the other being made of artificial coal.

---

It is already known with ball joints to make at least one of the bearing surfaces being movable relatively towards each other from a nonmetal material. Such material may be a more or less elastic synthetic material or a synthetic material with rigid or elastic properties respectively, such as polyamide plastic, superpolyamide plastic or similar. It has also already been suggested to use caoutchouc elastic plastics belonging to the group of polyaddition products, such as polyurethane, for nonmetal bearing surfaces, while the other bearing surface, in this particular case, had been made from steel.

The main object of the present invention is to provide a ball joint with comparatively great bearing and load capacities and a good resistance to wear which is easily running, relatively inexpensive and even suitable for service-free operation.

Surprisingly, it has been found according to the present invention that such joint will be obtained if one of the bearing surfaces being movable relative to each other is made from so-called artificial coal, while the other bearing surface consists of plastic.

Artificial coal is a material produced from carbon powder. Said carbon, for instance in the form of natural substances such as ground coal, graphite, or in the form of artificial substances resulting from other processes, such as coke, soot, retort carbon, is mixed with binding agents, for instance with tar, etc., and, for example, burnt and, if necessary, graphited. Electrode graphite appeared to be especially suited as artificial coal to be selected for this purpose. The artificial coal bearing surface may have been produced either from solid material or by means of forming.

According to the present invention the favorable properties of artificial coal will be combined with the favorable properties of plastic. Pairing of artificial coal and plastic will even be favorable in that heat developed especially in the case of elastic plastic is satisfactorily transferred via the artificial coal and it will therefore not be possible that, for instance on very bad roads, that the temperature of the plastic will constantly rise due to lack of heat transfer and will finally be so high as to be detrimental to the plastic or as to destroy the same. Heat transfer of plastic is known to be unfavorable. It may happen therefore that in the case of alternate loads occurring with motor vehicles and which are not unusual, together with the development of heat, heating of the plastic material is rising to a temperature no longer to be tolerated by the same. It will, however, hardly be possible to provide for artificial heat transfer in ball joints. Now, by means of the bearing surface consisting of artificial coal which, apart from especially favorable gliding properties, has remarkable heat transfer qualities, heat is quickly transferred towards the outside so preventing detrimental heat development. Due to said favorable effect the field of utilisation of ball joints provided with plastic bearing surfaces is extended at the same time increasing their safety.

It will be especially recommendable to pair the artificial coal bearing surface with a bearing surface being made from caoutchouc elastic plastic belonging to the group of polyaddition products with a net structure, such as polyurethane. In addition to surprisingly easy run due to the artificial coal, such pairing results in a release moment resulting from the plastic bearing surface which effect may be desirable in a number of cases. Above all, however, ball joints having bearing surfaces of caoutchouc elastic plastic or bearing surfaces of polyurethane plastic with a net structure which are looking back upon good practical results, will benefit by good heat transfer due to the bearing surface which has been made from artificial coal which surface, in this connection, is some sort of superheat protection resulting in a wider range of utilisation of the ball joints in question.

Bearing surfaces consisting of other plastic material such as acetal resin, may also be paired with an artificial coal bearing surface.

The accompanying drawing shows two examples of a construction according to the present invention.

FIG. 1 is a vertical section of a ball joint in which the ball head of the joint pin is supported between two bearing surfaces.

FIG. 2 is a vertical section of a ball joint in which the ball head of the joint pin is a spherical segment.

With respect to both embodiments the joint case has been identified by 1 and the joint pin by 2.

In FIG. 1 the ball head 3 of the joint pin has been provided with a coating 15 consisting of plastic and more particularly of a polyurethane with net structure based plastic. The two bearing elements 4 and 5 have beed made from artificial coal. It may also be possible that the bearing elements are made from plastic while the ball head coating consists of artificial coal. In this case the ball head will have been coated with artificial coal.

In the ball joint as shown in FIG. 2 the joint pin 2 has a head 9 with a spherical surface. The bottom side of the head forms a shoulder. The joint pin 2 has been inserted through a spherical cap or a spherical segment 10 on which it is supported by means of the shoulder. The spherical segment 10 is made from artificial coal. It is supported in a bush 16 which is made from plastic such as acetal resin, preferably of a polyurethane with net structure based plastic. It will also be possible that the bush 16 consists of artificial coal, while the spherical segment is plastic. The case is closed by a cover 11 which has been rolled in into the case. The cover has a hollow ball surface corresponding to the spherical shape of the joint pin head.

Of course, still further embodiments of the ball joint according to the present invention will be possible.

I claim:
1. A ball joint, especially for guides, steering gear, and wheel suspensions, preferably in motor vehicles, comprising a joint housing having a substantially spherical bearing surface therein and a joint pin supported in said joint housing on said substantially spherical bearing surface by a ball head on one end of said pins so that it will be universally movable in said housing, characterized in that said substantially spherical bearing surface and ball head are movable relative to each other and one is made from artificial coal and the other is made of a synthetic plastic so as to effect a more efficient transfer of heat via the artificial coal and avoid serious detrimental effects of heat on the plastic.

2. A ball joint according to claim 1, characterised in that the plastic bearing surface is made from a plastic preferably belonging to the group of polyaddition products with a net structure such as polyurethane plastic and acetal.

References Cited

UNITED STATES PATENTS

| 1,300,501 | 4/1919 | Sorel | 308—238 |
| 3,025,090 | 3/1962 | Langen | 287—87 |

FOREIGN PATENTS 1,299,403   6/1962   France.

CARL W. TOMLIN, *Primary Examiner.*

A. KUNDRAT, *Assistant Examiner.*